Figure 1:
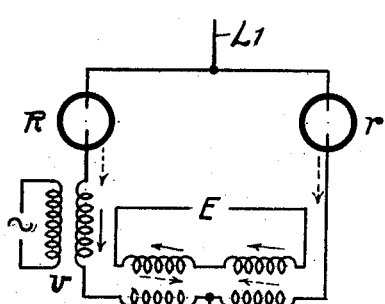

Dec. 31, 1929.    J. M. SCHMIERER    1,741,480
APPARATUS FOR OBVIATING NETWORK NOISES
Filed Jan. 26, 1925

INVENTOR
Johannes Michael Schmierer

Samuel Ostrolenk
ATTORNEY.

Patented Dec. 31, 1929

1,741,480

UNITED STATES PATENT OFFICE

JOHANNES MICHAEL SCHMIERER, OF GROSS LICHTERFELDE, NEAR BERLIN, GERMANY, ASSIGNOR TO RADIO PATENTS CORPORATION, OF NEW YORK, N. Y., A CORPORATION OF NEW YORK

APPARATUS FOR OBVIATING NETWORK NOISES

Application filed January 26, 1925, Serial No. 4,936, and in Germany January 23, 1924.

An application for the subject matter of this invention has been filed in Germany, January 23, 1924.

If quantitative valves, for instance electron tubes (for the amplifying or rectifying of alternating currents, for detecting or exciting electric oscillations and the like) are fed from power lines or in general at a voltage which is more or less variable, the so-called network noises (for instance brush noises, stray currents or current induced from neighbouring lines and the like) make themselves conspicuous. To avoid the same choke devices, filters and similar arrangements have been hitherto used which let pass only continuous current. All these choke devices bar only alternating current of a definite frequency range and even that not perfectly. They possess further the inconvenience of requiring much space, especially when containing condensers of high capacity.

This invention has for its object to avoid the network noises regardless of their frequency (or frequencies). With this object in view the influenced current of the valve (that is the amplified current in case of an amplifying vacuum tube) is transformed and a second current is superposed on this transformed current; said superposed current being obtained by the transformation of a current taken from the same sources of current. In order to obtain a perfect compensation of the disturbances due to the variations of voltage two conditions must be fulfilled: 1st:—The two secondary coils which are used must be connected the one with the other in such a manner that the induced electro-motive forces are directed the one against the other, e. g. so that, at a variation of the working voltage a positive voltage is induced in the one transformer and a negative voltage in the other transformer, 2nd:—the induced electro-motive forces must be equal. As conductor to be connected to the source of current a device is preferably used which is electrically equivalent to the quantitative valve; as in this case two similar transformers can be used which present not only the advantage of simplicity but are also absolutely necessary for completely doing away with the network noises. If as conductor a second quantitative valve is used which is controlled by the same current as the first valve the network noises disappear in the secondary circuit while the electro-motive currents induced by the controlled currents add themselves up.

In the accompanying drawing several diagrams of connection according to the invention are shown on Figs. 1–6, glow discharge tubes possessing a negative characteristic of current voltage being supposed to serve as quantitative valves, for simplicity's sake, all accessory apparatus being omitted.

In all the figures $L^1$ and $L^2$ designate the two power lines the voltage of which is not absolutely constant but composed of a continuous current voltage and superposed alternating voltages. In the primary coils of the transformers T$t$ flows consequently continuous current with superposed alternating currents. The continuous current is not capable at all of inducing voltages in the secondary coils of these transformers while the superposed alternating currents induce electro-motive forces which are oppositely directed. E is any convenient indicating instrument for instance a telephone or an oscillograph. This instrument is therefore not influenced by the working current itself or by the variations of the same. $\infty$ designates the source of current which produces the influencing current e. g. the current to be amplified. This source is for instance a source of alternating current, a microphone (with source of continuous current) or the like. U designates in all figures the entrance transformers. The coil of the transformer U which is connected to $\infty$ is the primary coil and the other is the secondary coil. The latter forms, together with the electrodes connected and with the discharge gaps situated between the same the entrance side of the amplifier.

Fig. 1 shows the simplest case of a glow discharge tube R without control electrodes, the current of which is influenced by superposition of an alternating current supplied from the transformer U. The influenced current flows through the primary winding of the transformer T the secondary coil of which feeds the receiver E. In order to do away with the network noises the secondary coil of a second transformer *t* is inserted, according to the invention, in the receiver circuit; the current from a second glow discharge tube *r* flowing through the primary winding of this transformer. The alternating current, superposed on the network currents induce in the secondary coils equal, but oppositely directed, electro-motive forces so that they leave the receiver E uninfluenced. The effect is the more perfect the greater the similarity of the characteristics of the current circuits, and for this reason the use of a glow discharge tube is more advantageous than that of an ohmic resistance although this ohmic resistance would also weaken the network noises extensively. Even if a primary coil of the transformer were directly connected to the network the network noises could be almost completely overcome when the dimensions of the same are chosen in correct manner.

The arrows in broken lines in this view indicate the disturbing fluctuations, while the full line arrows indicate the operating current, which is influenced by the transformer U, so that impulses are transmitted therewith and can be perceived in the receiver E.

Figure 2:
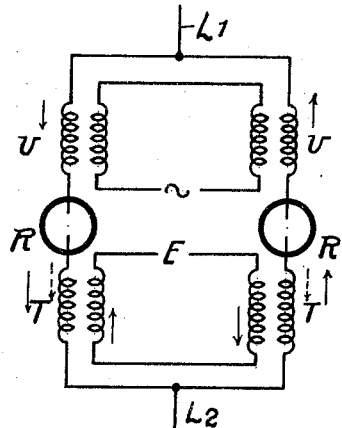

In Fig. 2 a second glow discharge tube R of similar construction and size is substituted for *r*. For the transformer *t* a second transformer T of similar construction and size as that on the left side of the diagram of connection is substituted and on the right side a second transformer U is arranged. The two primary coils of the transformers U are series-connected in such a manner that oppositely directed electro-motive forces are induced in the secondary coils thereof. A variation of the control current will then cause at the same time a weakening of the tube current at the left side and a strengthening on the right side whereby in the two secondary winding of T equally directed electro-motive forces are induced which are connected in such a manner that similar variations in the primary coils induce oppositely directed electro-motive forces in the secondary coils. The receiver is therefore liberated of the influence of the network noises while the controlling effect is doubled when the two transformers are of similar construction, this being however not absolutely necessary.

In Figure 2 again the full line arrows indicate the operating current and the broken line arrows the disturbing fluctuations, which are caused to oppose each other in the secondary coils of the circuit E and thus neutralized, while the working current is utilized by the transformers U to effect the indicating device E.

Figure 3:
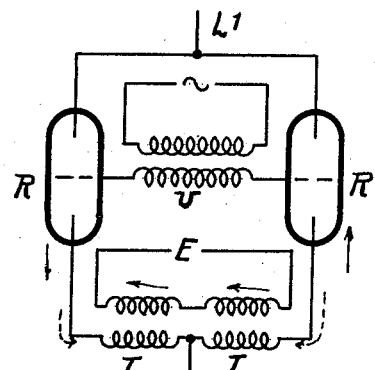

Fig. 3 shows the application of the invention to tubes with one control electrode (grid). The connection is simplified in so far as only one transformer exists. If the control electrodes require a preliminary voltage this is preferably laid on the middle of the secondary coil across a tapping point. The full and broken line arrows in this view indicate the same effects as in Figure 2.

Figure 4:
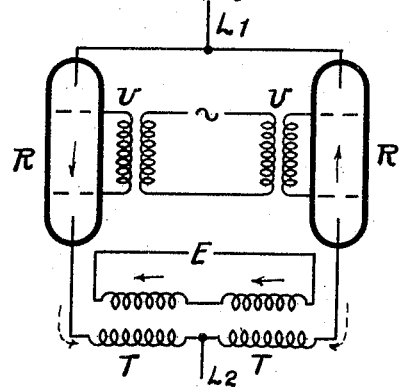

Fig. 4 shows an example of connection for tubes comprising each two control electrodes. In each of the two tubes the two control electrodes are connected to the secondary coil of a translator. The two primary coils are series-connected in such a manner, that they produce oppositely directed controlling effects. The broken and full line arrows in this view indicate the same results as in Figure 2.

Figure 5:
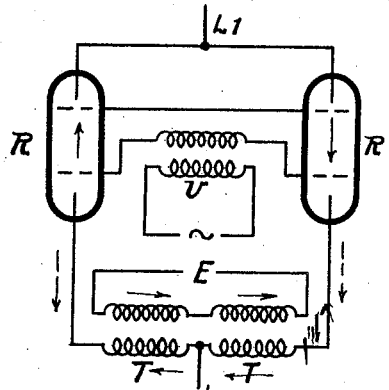

The connection arrangement shown in Fig. 5 is simpler. In this connection only one transformer can be used the secondary coil of which is connected to two control electrodes of equal value, the other two control electrodes of equal value being directly connected the one to the other. If necessary, preliminary voltages are laid on across a tapping point at the middle of the secondary coil. Variations of the control current produce also in the connection arrangements shown in Figs. 4 and 5 oppositely directed control effects in the two-current branches, so that similarly directed electro-motive forces are induced in the receiver circuit. The broken line arrows and full line arrows in this view indicate the same effects as in Figure 2.

In the connections with two transformers the primary windings of the same could also be parallel-connected instead of series-connected. For the two transformers T one single transformer may be substituted the primary coil of which is tapped at the middle (the relay R being the same). In this case the advantage is obtained that the core is not magnetized by the network current so that no distortions of the curves can be caused by iron saturations. Also with a dissimilar relay the core is much more feebly magnetized than in the case of two separate transformers. In a similar manner one single correspondingly tapped transformer may be substituted for the transformers of a connection with two transformers.

Figure 6:
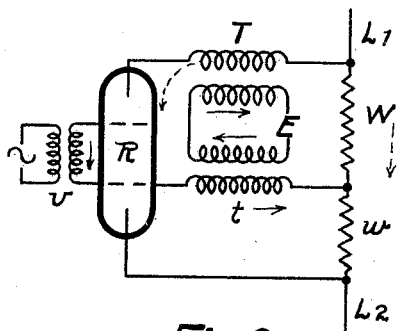

If two currents exist in a quantitative relay, which currents are influenced in the same direction by variations of the network voltage but in opposite direction by the control current, or inversely, or even when the control current or the network current influences only one of the relay currents no second relay is required for doing away with the network noises. An example of this connection is shown in Fig. 6. The control current is conducted to the two control electrodes across the transformer U. A preliminary voltage is applied to the lower control electrode from the voltage divider composed of the two resistances W and *w*. A branching of the current takes place in the tube. A portion of the current supplied through the lower electrode flows to the lower control electrode and another portion to the upper electrode. It is supposed that variations of the control current weaken the one portion of the tube current and strengthen the other portion of the same (although not necessarily in the same measure) while variations of the network voltage cause evidently similar variations of the two tube currents (although not of the same value).

In each of the two branches the primary coil of each of the two transformers T and t are situated, the secondary coils of which are connected in opposition so that at a corresponding ratio of translation the receiver E is liberated of the network noises while the electro-motive forces induced by variation of the control current reinforce one another. The broken line arrows and full line arrows indicate the same effects as in Figure 2.

The invention is applicable to relays of any type and to all relay-arrangements for production or detection of electric oscillations as well as for rectifying or strengthening of alternating currents in simple and in cascade connection.

I claim:—

1. In a control system, a power supply circuit, a pair of series connected resistors shunted across said circuit, an electron discharge tube having a pair of electrodes connected to the terminals of said power supply circuit, a pair of control electrodes, a variable current control circuit connected to said pair of control electrodes, a circuit extending between one of said control electrodes and a point between said pair of resistors, an inductance disposed in said last mentioned circuit, an independent inductance disposed in the connection between one terminal of said power supply circuit and one of said pair of electrodes and an output circuit coupled to each of said inductances for delivering current modified in accordance with said control circuit and free of interference from said power supply circuit.

2. In a system for energizing electron tubes, a power supply circuit, electron tube means having electrodes therein connected to opposite sides of said power supply circuit, control electrodes for said electron tube means, an inductance disposed in the connection between one of said first mentioned electrodes and one side of said power supply circuit, a separate inductance disposed between a point in said power supply circuit and one of said control electrodes and an output circuit differentially coupled with said inductances for delivering energy free of current fluctuations of said power supply circuit.

3. In a system for energizing electron tubes, a power supply circuit, electron tube means having electrodes therein connected to opposite sides of said power supply circuit, control electrodes for said electron tube means, a pair of impedances connected across said power supply circuit between said first mentioned electrodes, an inductance connected in series between one side of said power supply circuit and one of said first mentioned electrodes, an inductance connected between one of said control electrodes and a point between said pair of impedances, and an output circuit differentially coupled to each of said inductances for delivering energy free of fluctuations in said power supply circuit.

4. In a system for energizing electron tubes, a power supply circuit, electron tube means having electrodes therein connected to opposite sides of said power supply circuit, control electrodes for said electron tube means, impedances connected acros said power supply circuit between said electrodes, an inductance disposed in the connection between one side of said power supply circuit and one of said first mentioned electrodes, an inductance disposed between a point in said impedances and that one of said control electrodes remote from that one of said first mentioned electrodes to which said first mentioned inductance is connected, and an output circuit differentially coupled with said inductances for delivering energy free of fluctuations from said power supply circuit.

In testimony whereof I affix my signature.

JOHANNES MICHAEL SCHMIERER.